United States Patent [19]

Kagstrom

[11] Patent Number: 4,892,294
[45] Date of Patent: Jan. 9, 1990

[54] DEVICE FOR LIQUID PUMPING
[75] Inventor: Per-Olof Kagstrom, Finspang, Sweden
[73] Assignee: Granges Aluminium Aktiebolag, Stockholm, Sweden
[21] Appl. No.: 299,330
[22] PCT Filed: May 8, 1988
[86] PCT No.: PCT/SE88/00111
§ 371 Date: Jan. 9, 1989
§ 102(e) Date: Jan. 9, 1989
[87] PCT Pub. No.: WO88/07165
PCT Pub. Date: Sep. 22, 1988

[30] Foreign Application Priority Data
Mar. 9, 1987 [SE] Sweden .............................. 8700966-8
Apr. 10, 1987 [SE] Sweden .............................. 8701514-5

[51] Int. Cl.$^4$ .............................................. F27D 23/04
[52] U.S. Cl. .................................... 266/233; 266/901; 366/341; 75/65 R; 75/68 R
[58] Field of Search ................ 366/341; 266/207, 208, 266/210, 233, 900, 901; 75/65 R, 68 R

[56] References Cited
U.S. PATENT DOCUMENTS
3,973,763 8/1976 Steinke et al. ....................... 266/233
4,355,789 10/1982 Dolzhenkov et al. ............... 266/207
4,518,424 5/1985 Ormesher ........................... 75/65 R FOREIGN PATENT DOCUMENTS
449790 5/1987 Sweden .
434105 11/1974 U.S.S.R. ............................... 266/210

*Primary Examiner*—Melvin J. Andrews
*Attorney, Agent, or Firm*—Spencer & Frank

[57] ABSTRACT

A device for liquid pumping, including a main chamber and a pump chamber for receiving a subportion of the liquid to be pumped from the main chamber and which is provided with means for cyclic variation of the pressure in the pump chamber between a pressure greater than a pressure less than the pressure in the main chamber. The pump chamber is connected to the main chamber by at least one input opening and at least one output opening. The input opening has a substantially lower flow resistance in the direction into the pump chamber than in the opposite direction and the output opening has a substantially lower flow resistance in the direction out of the pump chamber than in the opposite direction. Thereby, when the pump chamber is at a pressure lower than the pressure in the main chamber, a larger liquid quantity is sucked into the pump chamber through the input opening and when the pump chamber is at a pressure lower than the pressure in the main chamber a larger liquid quantity is forced out through the output opening than through the input opening, so that a net liquid quantity is sucked in through the input opening and forced out through the output opening.

12 Claims, 2 Drawing Sheets

DEVICE FOR LIQUID PUMPING

FIELD OF THE INVENTION

The present invention relates to a device for liquid pumping and comprises a pump chamber which is arranged to receive a subportion of the liquid to be pumped. The pump chamber is provided with means for cyclic variation of the pressure in the pump chamber between a pressure greater than and a pressure less than in the chamber where the main portion of the liquid is. The pump chamber is further provided with at least one input opening and at least one output opening. The device can be used to pump all kinds of liquids, for example for stirring molten metal bodies in connection with holding or degasifying of such bodies, for circulation by pumping of aggressive or corrosive liquids, or for pumping of two liquid states for reducing the risk of emulsion forming.

TECHNOLOGY REVIEW

Furnaces for melting of metal, for example aluminium scrap, having means for circulation of the melted charge are previously known. Such furnaces generally comprise a main chamber provided with heating means, generally in the shape of gas or oil burners, for melting heavy material; a side chamber to be charged with small scrap; and a pump chamber for circulation of melted metal between the main chamber and the side chamber. A furnace of this type is disclosed in the Swedish patent publication 8200622-2. In this furnace, controllable pistons are used as valves which open and close openings between the pump chamber and the main chamber or the side chamber for guiding molten metal between the main chamber and the side chamber. However, such controllable pistons are heavily worn in the hard environment in which they work and must therefore be replaced regularly thereby entailing a maintenance cost. Furthermore, the provision of controllable piston valves also entails a comparatively high initial cost for the equipment.

SUMMARY OF THE INVENTION

The main object of the invention is, therefore to provide a device for liquid pumping which enables pumping of molten metal as well as pumping of many other types of liquids for stirring or circulation without the use of movable piston valves, so that the maintenance costs are reduced to a minimum and also the initial costs are reduced substantially. This object is achieved by a device for liquid pumping, including a main chamber and a pump chamber for receiving a subportion of the liquid to be pumped from the main chamber and which is provided with means for cyclic variation of the pressure in the pump chamber between a pressure greater than and a pressure less than the pressure in the main chamber. The pump chamber is connected to the main chamber by at least one input opening and at least one output opening. The input opening has a substantially lower flow resistance in the direction into the pump chamber than in the opposite direction and the output opening has a substantially lower flow resistance in the direction out of the pump chamber than in the opposite direction. Thereby, when the pump chamber is at a pressure lower than the pressure in the main chamber, a larger liquid quantity is sucked into the pump chamber through the input opening and when the pump chamber is at a pressure lower than the pressure in the main chamber a larger liquid quantity is forced out through the output opening than through the input opening, so that a net liquid quantity is sucked in through the input opening and forced out through the output opening.

In an alternative embodiment, the present invention provides a melting furnace or similar device having a main chamber, a side chamber connected to the main chamber by an opening in a furnace wall; and a pump chamber connected to the main chamber as well as to the side chamber by at least one opening to each chamber in the furnace wall. The pump chamber is provided with means for cyclic variation of the pressure in the pump chamber between a pressure higher than the pressure in either the main or side chamber and a pressure lower than pressure in the remaining chamber. At least one of the openings between the pump chamber and the main chamber and the side chamber, respectively, is designed as a channel so that flow resistance is less in one direction than in the other direction and so that when the pump chamber is at a pressure lower than the pressure in one of the two other chambers molten metal is sucked into the pump chamber from that chamber and when the pump chamber is at a pressure higher than the pressure in the remaining chamber molten metal is forced from the pump chamber into this chamber. Thereby molten metal is pumped in the direction from the main chamber to the side chamber or in the opposite direction.

Due to the fact that the input opening of the pump chamber has a substantially lower flow resistance in the direction into the pump chamber than in the opposite direction and the output opening of the pump chamber has a substantially lower flow resistance in the direction out of the pump chamber than in the opposite direction, a net quantity of liquid can be sucked in through the input opening and forced out through the output opening by pressure variations in the pump chamber without the use of movable valves.

Due to the fact that the openings are shaped as channels, i.e. have a certain length in the flow direction, a direction dependent flow resistance can easily be provided. This means that the flow quantity per time unit can be made different in the different directions in an easy way. Thus, with a cyclic variation of the pressure in the pump chamber a net flow is obtained in the direction in which the flow resistance is the least.

Two embodiments of the device according to the invention will now be further described below with reference to the accompanying drawings.

DESCRIPTION OF THE PREFERRED EMBODIMENTS

Figure 1:
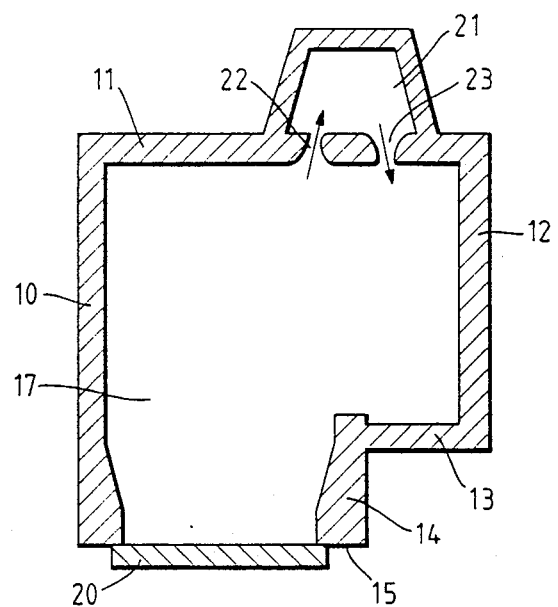
FIG. 1 is a schematical view of a melting furnace of the type set forth above having a main chamber and a pump chamber in which the input and output openings have been designed according to the invention.

The furnace, shown in a cross sectional view in FIG. 1, comprises a furnace chamber which besides the bottom and top (not shown) has surrounding walls 10–15. One side wall 15 of the furnace chamber is provided with a removable cover 20 for charging the main chamber of the furnace with heavy aluminium scrab. At the opposite side wall 11 of the furnace, a pump chamber 21 is provided which is connected to the main chamber through channels 22 and 23 in the side wall 11. Thus, molten metal can circulate from the main chamber 17 through the pump chamber 21 back into the main chamber, as indicated by means of arrows. This will cause a stirring of the molten metal, for example for a more equal distribution of the heat supplied to the molten metal or for degasifying the molten metal.

The channels 22 and 23 are designed with successively decreasing flow areas. The channel 22 has its largest flow area at the end facing the main chamber 17 and its smallest flow area at the end facing the pump chamber 21. The channel 23 has its largest flow area at the end facing the pump chamber 21 and its smallest flow area at the end facing the main chamber. Both channels 22,23 have smooth rounded edges at the end having the largest flow area and sharp edges at the end having the smallest flow area. Due to this design of the channels, the channels have different flow resistances in different directions. The channel 22 has a substantially smaller flow resistance for molten metal flowing from the main chamber 17 into the pump chamber 21 than for metal flowing from the pump chamber into the main chamber. The channel 23 has a substantially smaller flow resistance for molten metal flowing from the pump chamber 21 into the main chamber 17 than for metal flowing from the main chamber into the pump chamber.

When the pressure in the pump chamber is lower than that in the main chamber, a larger quantity of molten metal will flow into the pump chamber through the channel 22 than through the channel 23. When the pressure in the pump chamber 21 is larger than that in the main chamber, a larger quantity of molten metal will flow into the main chamber through the channel 23 than through the channel 22. This will cause a net flow of molten metal from the main chamber through the channel 22 into the pump chamber 21, through the pump chamber and out of the pump chamber 21 through the channel 23, as indicated by means of the arrows in the openings 22 and 23. Thus, due to the cyclic variation of the pressure in the pump chamber and the design of the channels 22,23, a circulation of molten metal is provided in the main chamber.

Figure 2:
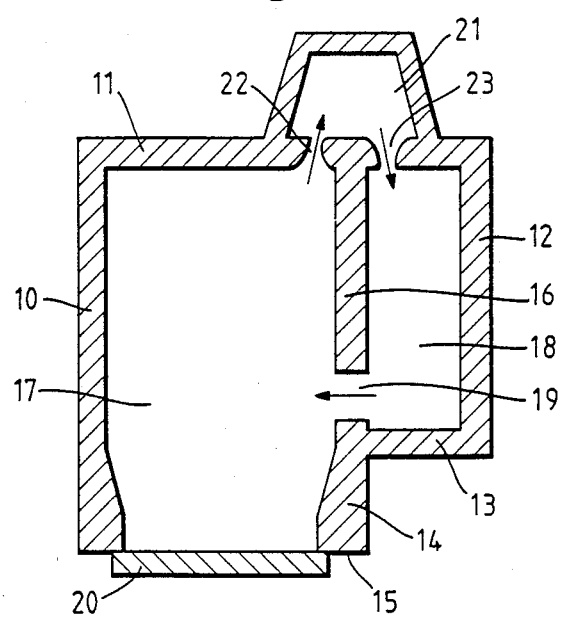
FIG. 2 is a schematical view of a melting furnace having a main chamber, a side chamber and a pump chamber in which the openings between the pump chamber and the main chamber and the side chamber, respectively, have been designed according to the invention.

The melting furnace shown in FIG. 2 is generally similar the furnace shown in FIG. 1 and, therefore, the same reference numerals have been used for corresponding parts in the two figures. However, the furnace according to FIG. 2 is provided with a partition 16, so that the furnace chamber is divided into a main chamber 17 and a side chamber 18. The side chamber is connected to the main chamber by an opening 19 in the partition 16. The main chamber is connected to the pump chamber by the channel 22, and the side chamber is connected to the pump chamber through the channel 23 in the side wall 11. The furnace operates in the same way as the furnace according to FIG. 1 with the difference that a net flow of molten metal flows from the main chamber through the pump chamber to the side chamber or possibly from the side chamber through the pump chamber to the main chamber.

Figure 3:
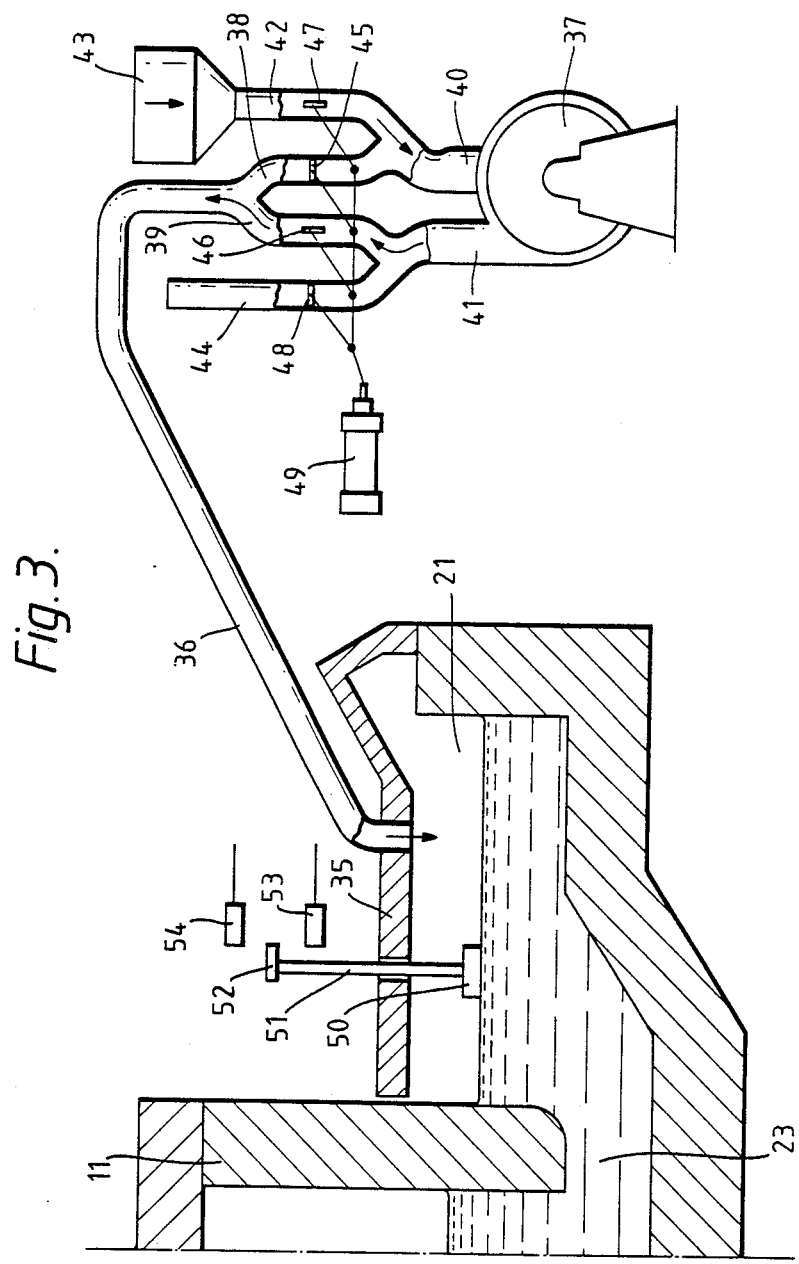
FIG. 3 is a schematic view in a larger scale of the pump chamber according to FIG. 1 connected to means for the provision of overpressure and depression in the pump chamber.

As shown in FIG. 3, the pump chamber 21 is provided with a cover 35, so that a closed space is formed. This closed space is connected to a fan 37 through a conduit 36. At the fan, the conduit is divided into two branches 38,39 of which one 38 is connected to the intake side 40 of the fan and the other 39 is connected to the exhaust side 41 of the fan. The intake side 40 of the fan is further connected to the ambient atmosphere through a conduit 42 and an air filter 43, and the exhaust side 41 of the fan is also connected to a conduit 44 for exhaust air from the fan. The conduits 38,39,42,44 are at the fan provided with throttle valves 45,46,47 and 48, respectively, which may be adjusted by means of a pneumatic control means 49 to close and open the separate conduits. The valves are connected in pairs, so that the intake side 40 of the fan is connected to the conduit 36 to the pump chamber and the exhaust side 41 of the fan is connected to the conduit 44 for discharge of exhaust air from the fan or, alternatively, the exhaust side 41 of the fan is connected to the conduit 36 to the pump chamber and the intake side 40 of the fan is connected to the atmosphere through the air filter 43. In the first case a depression is provided in the pump chamber with regard to the pressure in the main chamber, i.e., the pump chamber is at pressure lower than the pressure in the main chamber, and in the last mentioned case, which is illustrated in FIG. 3, an overpressure, i.e., the pump chamber is at a pressure higher than the pressure in the main chamber, is provided in the pump chamber. The overpressure and the depression, respectively, may be about 0.2 atmospheres with regard to the pressure in the main chamber.

The pump chamber is further provided with a float having a vertically movable floating body 50. The body 50 is attached to a guide rod 51 which is movable in a bearing in the cover 35 of the pump chamber. The top end of the guide rod is provided with an indicator 52 which is arranged to cooperate with a lower and an upper impulse generator 53,54 for indication of a minimum level and a maximum level, respectively, of the molten metal in the pump chamber. The floating body 50 and the guide rod 51 with the indicator 52 are shown in FIG. 3 in an intermediate position.

The impulse generators 53,54 are connected to a control device (not shown) which control the throttle valves 45–48 at the fan to provide a cyclic variation of the pressure in the pump chamber.

Due to the cyclic variation of the pressure in the pump chamber and the above described design of the channels, a net flow of molten metal will flow from the main chamber through the pump chamber back to the main chamber, alternatively through the side chamber, which causes circulation of molten metal in the main chamber. The cyclic variation of the pressure can occur with a frequency of 1 cycle per minute. With a pump chamber volume of 4 cubic meters this will give a pumping capacity of about 2–3 tons of aluminium per minute.

While only two embodiments of the device have been shown and described, it is obvious that many modifications and variations are possible within the scope of the invention. For example, the pump chamber must not necessarily form a unit together with the main chamber but may form a separate unit which can be connected to the main chamber by means of suitable conduits. The channels between the pump chamber and the main chamber may have a decreasing flow area along only a portion of the full length of the channel or along the full length of the channel and may for example, have the shape of a trumpet or a truncated cone. The edges of the channels at the end where the flow area is largest may be tapered instead of rounded. The edges of the channels at the end where the flow area is smallest may be more or less sharp. The sharper the edges are, the higher the flow resistance for the liquid flowing into the channels at the sharp edges. The channels may also completely or partly consist of inserted tube portions which project from the wall and thus form a sharp edge at the channel end where the flow area is smallest. The channels may then easily be made longer and may form an angle with the wall through which they run. The channels may then also be designed with several sections, if necessary to obtain the desired difference in flow resistance between the different directions. Instead of designing the channels with a decreasing flow area the channels may be designed to give turbulence or disturbances in the flow which are different for different flow directions, so that in this way different flow resistances in different directions are obtained. This may be provided by means of one or more inserted means in the channels. Finally, in certain cases it may be sufficient that only one opening is designed as a channel with different flow resistance in different directions to obtain some circulation through the pump chamber. However, the pump power and consequently the circulation of liquid are less than if several channels with different flow resistances are used. It is, of course, also possible to provide several input openings or input channels and several output openings or output channels to and from, respectively, the pump chamber and give these openings or channels different flow areas. However, it is essential that the openings or channels and their flow resistances are designed in such a way that a net quantity of the liquid is fed through the input and output openings, so that a net flow is obtained through the pump chamber.

I claim:

1. A device for liquid pumping, comprising a main chamber and a pump chamber for receiving a subportion of the liquid to be pumped from said main chamber and which is provided with means for cyclic variation of the pressure in said pump chamber between a pressure greater than the pressure in said main chamber and a pressure less than the pressure in said main chamber, said pump chamber being connected to said main chamber by at least one input opening and at least one output opening, wherein said input opening has a substantially lower flow resistance in the direction into said pump chamber than in the opposite direction and said output opening has a substantially lower flow resistance in the direction out of the pump chamber than in the opposite direction, so that when said pump chamber is at a pressure lower than the pressure in said main chamber a larger liquid quantity is sucked into the pump chamber through the input opening and when said pump chamber is at a pressure lower than the pressure in said main chamber a larger liquid quantity is forced out through the output opening than through the input opening, so that a net liquid quantity is sucked in through said input opening and forced out through said output opening.

2. The device according to claim 1, wherein the openings are designed as channels having less flow resistance in one direction than in the other direction.

3. The device according to claim 2, wherein each channel has a flow area decreasing one flow direction.

4. The device according to claim 3, wherein said channels at the end where the flow area is largest have bevelled edges.

5. The device according to claim 4, wherein said channels at the end where the flow area is largest have smooth rounded edges.

6. The device according to claim 3, wherein said the channels at the end where the flow area is least have sharp edges.

7. The device according to claim 3, wherein said flow area of each channel decreases continuously along the full length between the ends of the channel.

8. The device according to claim 7, wherein the flow area of each channel decreases continuously along the full length between ends of the channel.

9. The device according to claim 1, wherein each opening is designed to cause turbulence for a flow in one direction but in the opposite direction.

10. The device according to claim 9, wherein at least one channel is provided with inserted elements causing turbulence.

11. A device comprising a melting furnace having a first and second chamber comprising: a main chamber and a side chamber connected to said main chamber by an opening in a furnace wall; and a pump chamber connected to said main chamber as well as to said side chamber by at least one opening to each chamber in a furnace wall and provided with means for cyclic variation of the pressure in said pump chamber between a pressure higher than the pressure in one of said first and second chambers and a pressure lower than the pressure in one of said first and second chambers, wherein at least one of said openings between said pump chamber and said main chamber and said side chamber, respectively, is designed as a channel so that flow resistance is less in one direction than in the other direction and so that when said pump chamber is at a pressure lower than the pressure in said first chamber molten metal is sucked into said pump chamber from said first chamber and when said pump chamber is at a pressure higher than the pressure in said second chamber molten metal is forced from said pump chamber into said second chamber, whereby molten metal is pumped in the direction from said main chamber to said side chamber or in the opposite direction.

12. The device according to claim 11, wherein all openings are designed as channels having less flow resistance in one direction than in the other direction and said channels are so related that the flow resistance in all channels are less either in the direction from the main chamber through the pump chamber to the side chamber or in the opposite direction.

* * * * *